United States Patent
Thomas et al.

(10) Patent No.: US 9,273,752 B1
(45) Date of Patent: Mar. 1, 2016

(54) VIBRATION ISOLATOR DEVICE FOR VEHICLE FAIRINGS

(71) Applicant: Hutchinson Aerospace & Industry, Inc., Hopkinton, MA (US)

(72) Inventors: Michael D. Thomas, Burlington, MA (US); William Hart, Framingham, MA (US); Franck Larmande, Grand Rapids, MI (US)

(73) Assignee: Hutchinson Aerospace & Industry, Inc., Hopkinton, MA (US)

( * ) Notice: Subject to any disclaimer, the term of this patent is extended or adjusted under 35 U.S.C. 154(b) by 0 days.

(21) Appl. No.: 14/531,956

(22) Filed: Nov. 3, 2014

Related U.S. Application Data

(60) Provisional application No. 61/899,461, filed on Nov. 4, 2013.

(51) Int. Cl.
| | |
|---|---|
| *F16F 1/00* | (2006.01) |
| *F16F 15/073* | (2006.01) |
| *B62D 35/00* | (2006.01) |
| *F16F 15/08* | (2006.01) |

(52) U.S. Cl.
CPC .............. *F16F 15/073* (2013.01); *B62D 35/00* (2013.01); *F16F 15/08* (2013.01)

(58) Field of Classification Search
CPC ........... F16F 15/08; F16F 7/00; F16F 15/073; B63B 21/663; B60G 13/00; B62D 35/00
USPC ................... 248/638; 267/195, 136
See application file for complete search history.

(56) References Cited

U.S. PATENT DOCUMENTS

| | | | | |
|---|---|---|---|---|
| 5,788,321 | A * | 8/1998 | McHorse ................ | B60R 3/007 280/163 |
| 2006/0021560 | A1* | 2/2006 | McMillan ............... | E21B 17/01 114/221 R |
| 2007/0104542 | A1* | 5/2007 | Somerville ........... | B63B 21/663 405/224.1 |
| 2012/0168019 | A1* | 7/2012 | Allen ........................ | F16L 1/15 138/103 |
| 2012/0243944 | A1* | 9/2012 | Masters ................ | B63B 21/663 405/216 |

* cited by examiner

*Primary Examiner* — Todd M Epps
(74) *Attorney, Agent, or Firm* — Kuta IP Law, LLC; Christine M. Kuta

(57) ABSTRACT

Truck fairings are connected together with a vibration-isolating bracket device. The device includes three parts: two brackets and a strap. The brackets are a lightweight material such as aluminum. The brackets are formed and configured to be coupled together by the strap without the need for further fasteners such as bolts or rivets. The strap is flexible and elastic and provides vibration isolation as well as coupling.

9 Claims, 10 Drawing Sheets

ID: 9,273,752 B1

VIBRATION ISOLATOR DEVICE FOR VEHICLE FAIRINGS

BACKGROUND

Reduction of aerodynamic drag contributes to increased fuel efficiency of a vehicle, for example, a truck. To reduce aerodynamic drag, fairings are installed to smooth the vehicle's outer surface which thereby smoothes air flow over the vehicle in motion and reduces drag. Fairings and the associated mounting devices, however, contribute to vehicle weight. Fairing vibration can interfere with vehicle operability and can create noise problems. Weight reduction of these added components is desirable to increase fuel efficiency. Vibration isolation is desirable to improve vehicle operability and noise.

First conventional devices for attaching fairings to the vehicle and to each other were brackets attached with simple metal straps. The metal straps often broke in service during normal vehicle operation. One attempt to address the problems described above and the problem of strap breakage is shown in FIGS. 1 and 2. FIG. 1 is an isometric view of a second conventional fairing bracket device. FIG. 2 is a top view of the second conventional fairing bracket device shown in FIG. 1. The design shown in FIGS. 1 and 2 allows for motion accommodation in the fore-aft direction of the vehicle with, for example, ten times the stiffness in the cross vehicle direction. The design shown in FIGS. 1 and 2, however, has an involved and therefore expensive manufacturing process. For example, one of the brackets includes a steel cylinder into which an opening is cut to accommodate the square tubing which is welded into place. The manufacturing process further includes four rivets to attach the fairing strap to a second bracket. A total of six components are part of the complete device in this conventional design. The components are also somewhat heavy.

It remains desirable to have a fairing mounting device that is lighter, addresses vibration and noise problems and is easier and less expensive to manufacture.

SUMMARY

The present invention is directed to a vibration isolator device for vehicle fairings. This isolator device is a lower cost, lighter weight device for connecting center, front and rear fairings, for example, for connecting class 8 truck fairings (e.g., the Kenworth T700 series trucks, Peterbilt trucks, and Paccar trucks). The vibration isolator design has fewer components than some conventional devices and allows for fore-aft displacement. Embodiments of the present vibration isolator device typically have only three components: two brackets and one strap. Embodiments of the present vibration isolator device further eliminate the need for welding and riveting operations which are involved in the manufacture of the conventional devices. In one embodiment, extruded aluminum rod is used in the place of cut steel tubing. This reduces the weight of the present device relative to conventional vibration isolator devices. The use of extruded aluminum instead of steel tubing reduces the weight of the mounting and vibration isolating bracket, for example, from 533 to 422 grams.

The present invention together with the above and other advantages may best be understood from the following detailed description of the embodiments of the invention illustrated in the drawings, wherein:

DRAWINGS

DESCRIPTION

A fairing vibration isolator device connects vehicle fairings together in such a way that vibration is isolated. The fairing vibration isolator device enables forward and back movement of the fairings. Embodiments of the fairing vibration isolator device include three parts: a cylindrical bracket, a y-bracket and a strap. The brackets are, for example, made of extruded aluminum and the strap is for example, made of rubber.

Figure 3:
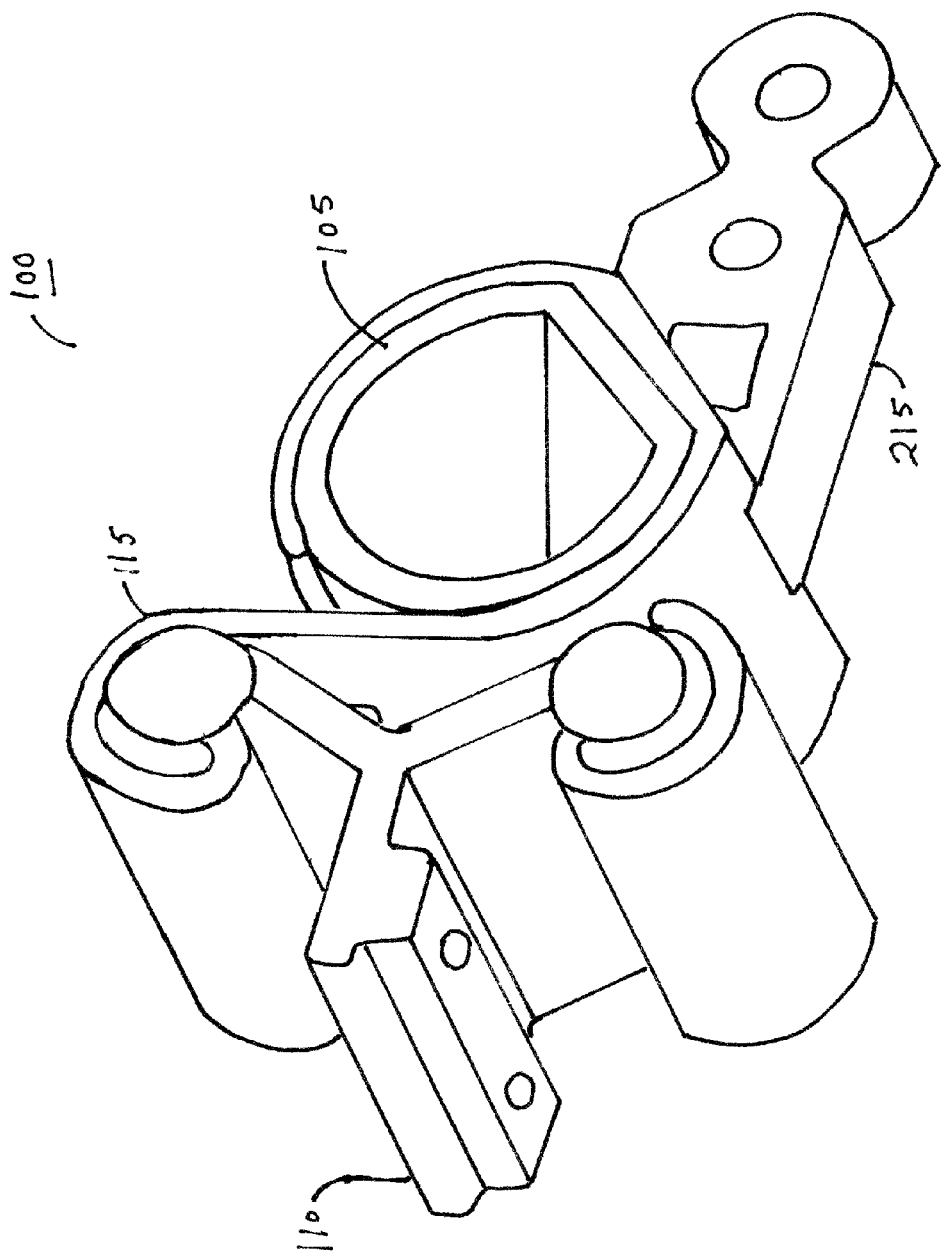
FIG. 3 is an isometric view of the fairing isolator device according to principles of the invention.
Figure 4:
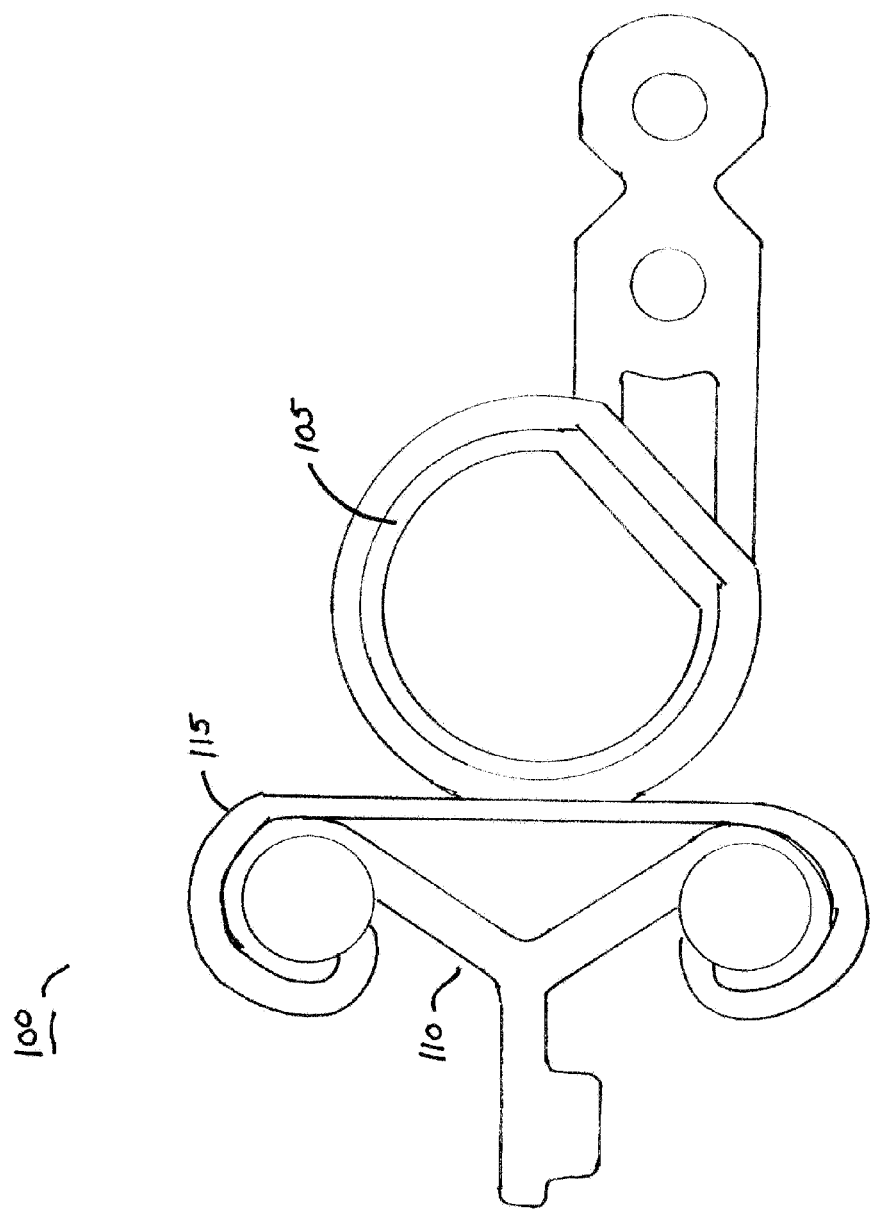
FIG. 4 is a top view of the fairing isolator device of FIG. 3.

FIG. 3 is an isometric view of an embodiment of the fairing isolator device. FIG. 4 is a top view of the fairing isolator device. The fairing isolator device 100 has a cylindrical bracket 105 coupled to a Y-bracket 110 by a flexible strap 115. Both brackets 105, 110 are, for example, extruded aluminum. The strap 115 is generally also elastic as well as flexible. The strap 115 is, for example, made of rubber.

Figure 5:
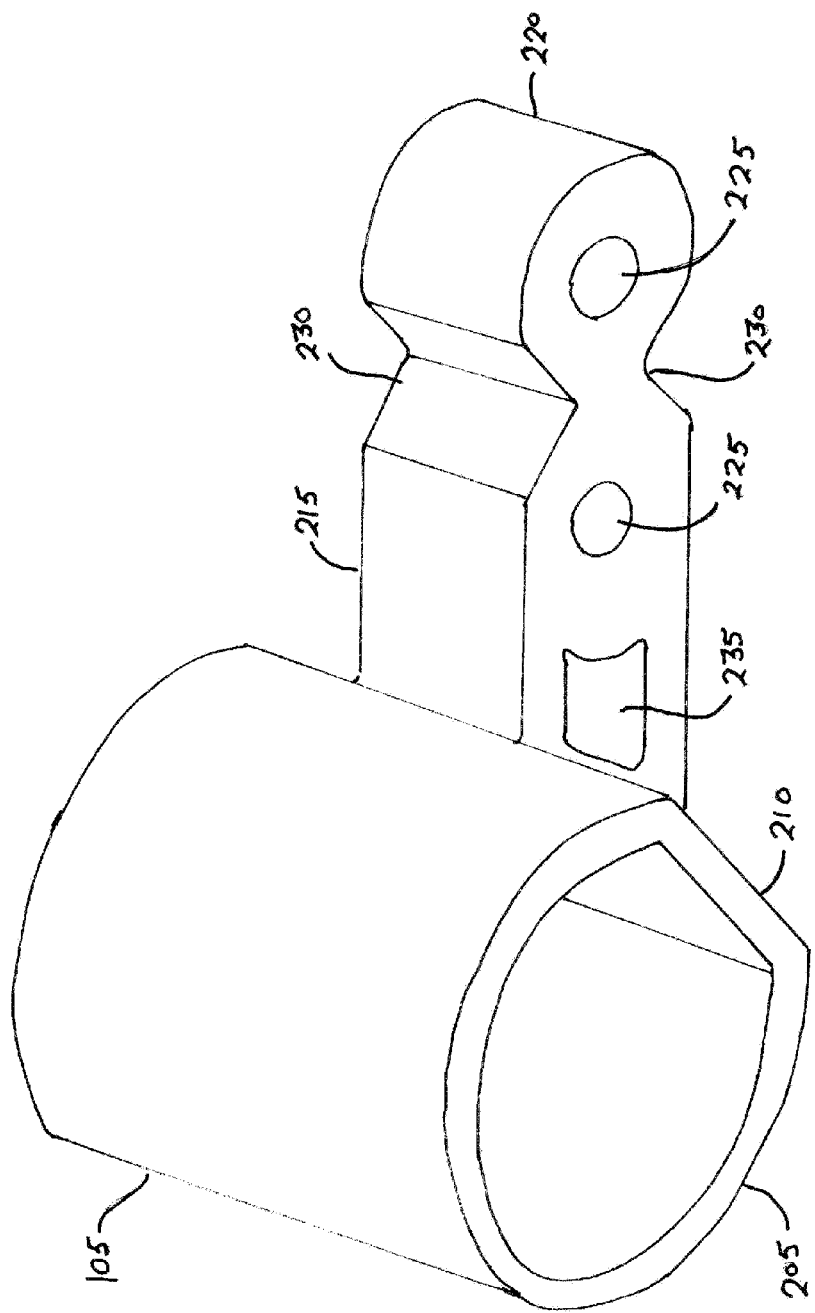
FIG. 5 is an isometric view of a cylindrical bracket in the fairing isolator device of FIG. 3.
Figure 6:
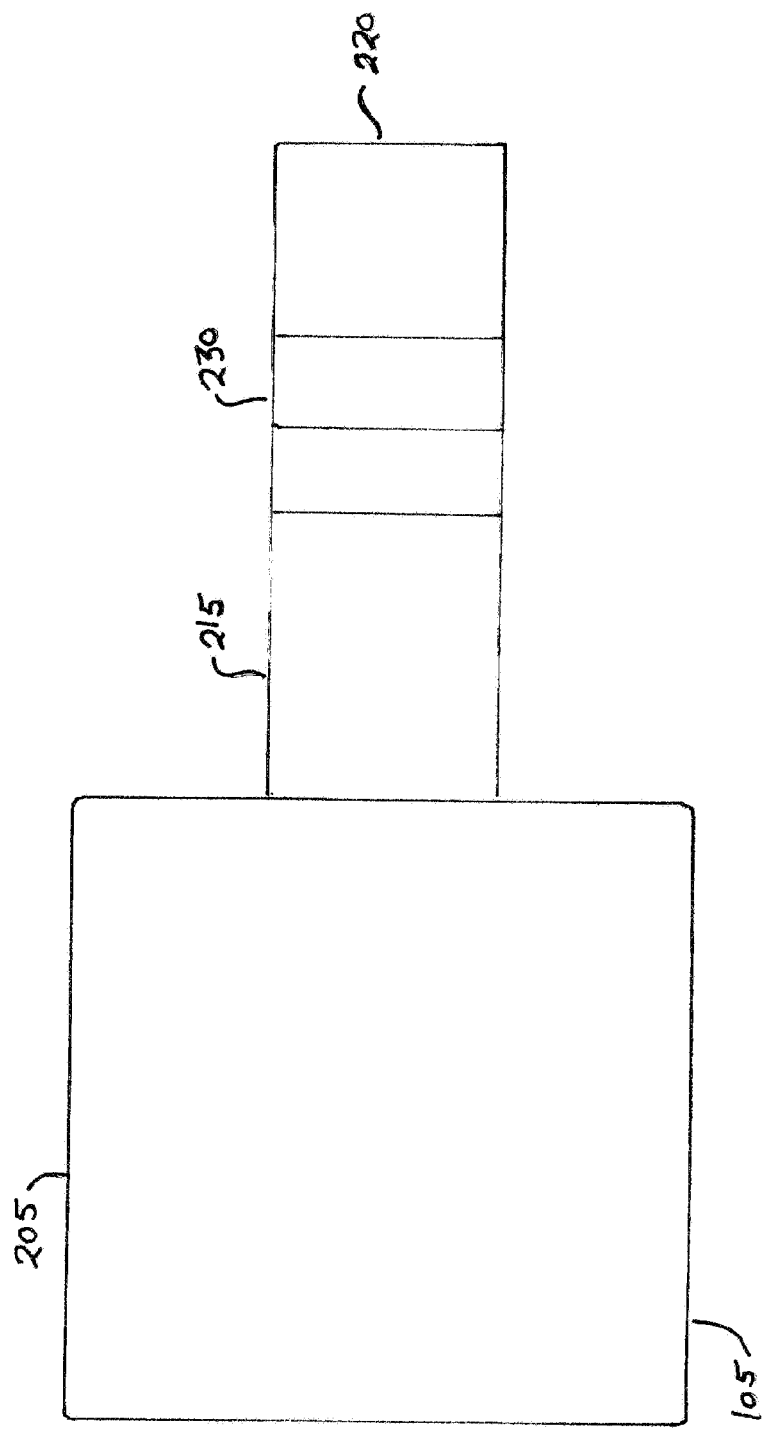
FIG. 6 is a side view of the cylindrical bracket of FIG. 5.

FIG. 5 is an isometric view of the cylindrical bracket 105 in the fairing isolator device embodiment shown in FIGS. 3 and 4. FIG. 6 is a side view of the cylindrical bracket 105. The cylindrical bracket 105 has a first near-cylindrical portion 205, that is, a cylinder having a flattened portion 210. A post 215 extends from the flattened portion 210, where the post 215 is rounded at the far end 220. The post 215 includes two holes 225 for attachment to a vehicle fairing.

The cylindrical bracket 105 is, for example, extruded aluminum. The aluminum is a lighter weight material than the steel used in conventional devices. In an alternative embodiment, the cylindrical bracket is made of 30% glass-filled nylon. Design elements further reduce the weight of the cylindrical bracket 105. In the present embodiment, the weight-reducing design elements are cutouts 230 along the post and another cutout 235 at the part of the post 215 that meets the flattened portion 210 of the cylinder. The form and configuration of the cylindrical bracket enables the bracket to be extruded as a single piece thereby saving several manufacturing steps over conventional devices such as the steps of cutting components and welding them together. The present embodiment is suitable to be machined to a desired width after extrusion.

Figure 1:
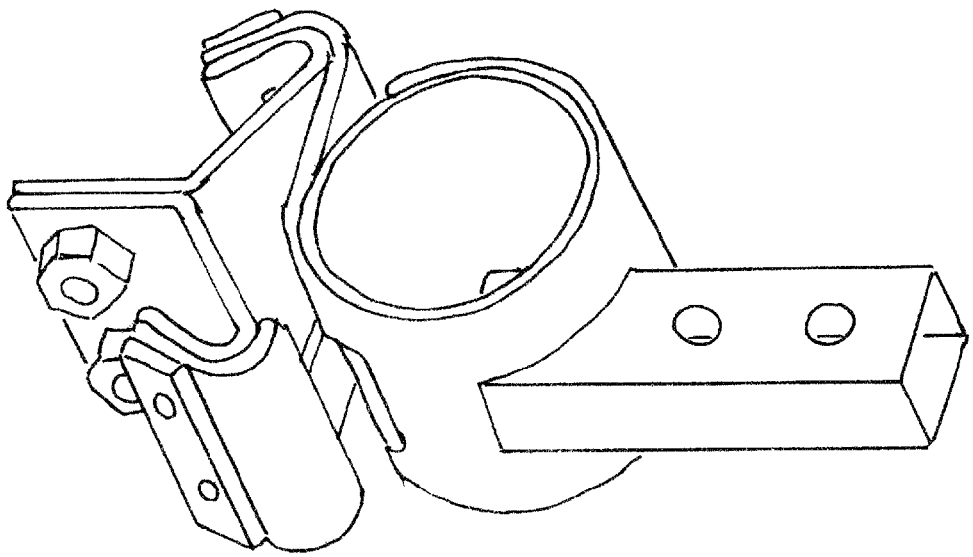
FIG. 1 is an isometric view of a conventional fairing bracket device.
Figure 2:
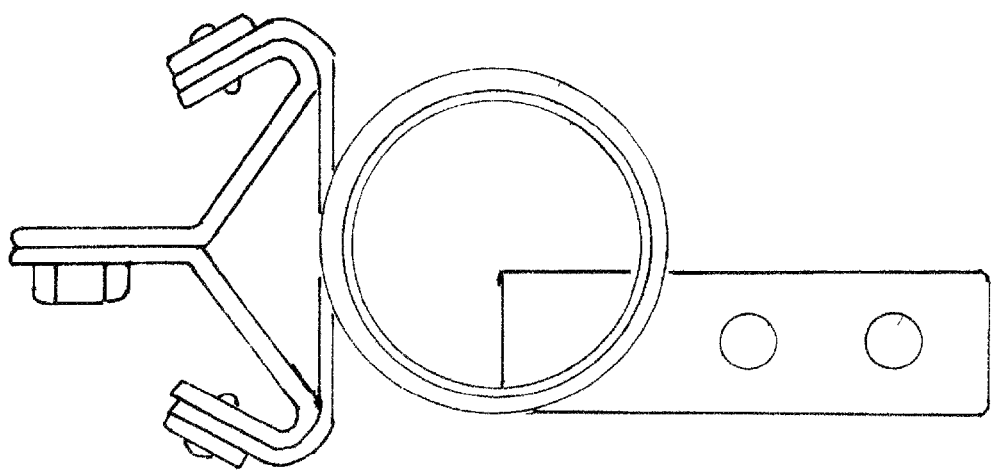
FIG. 2 is a top view of the conventional fairing bracket device of FIG. 1.
Figure 7:
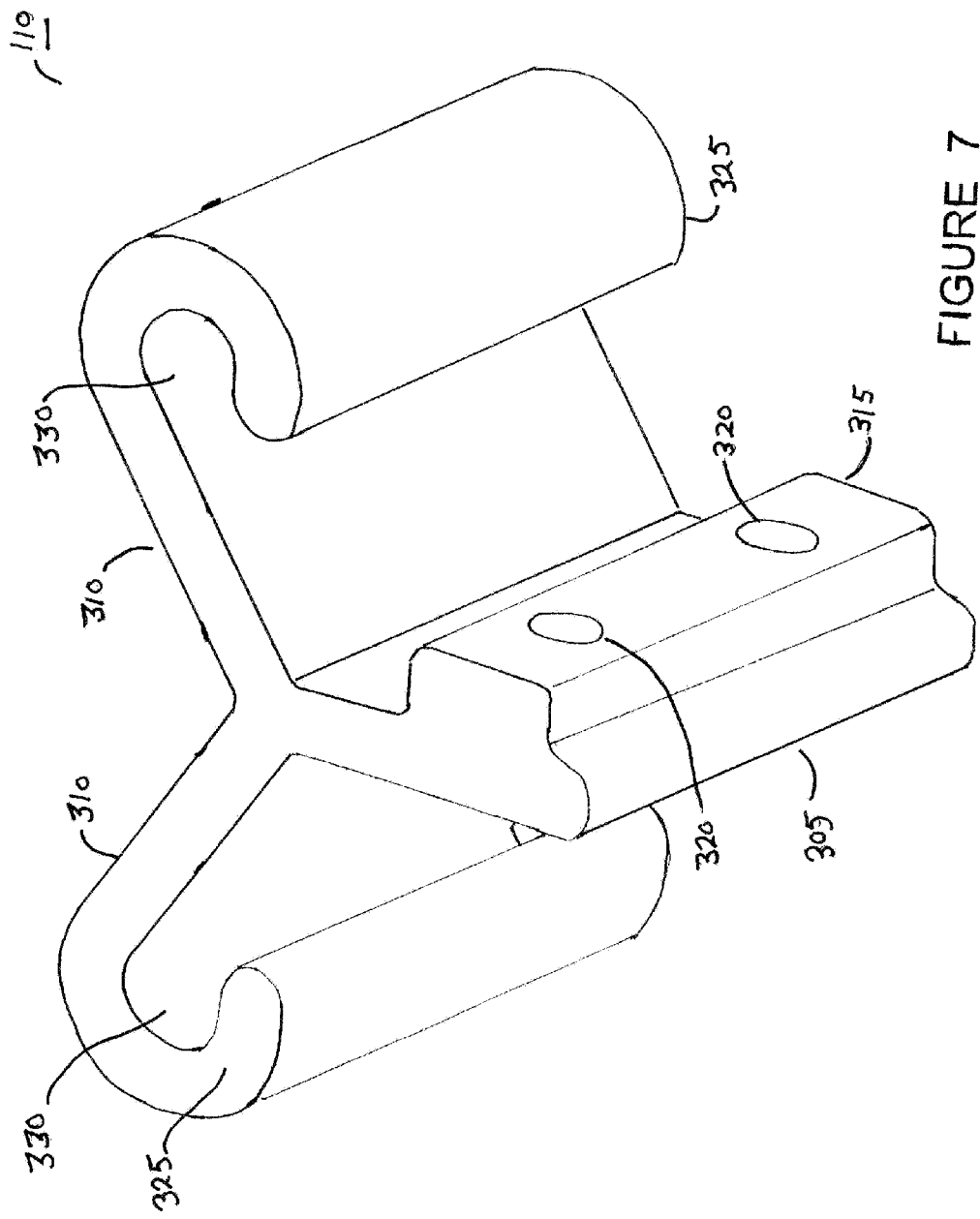
FIG. 7 is an isometric view of a Y-bracket in the fairing isolator device of FIG. 3.
Figure 8:
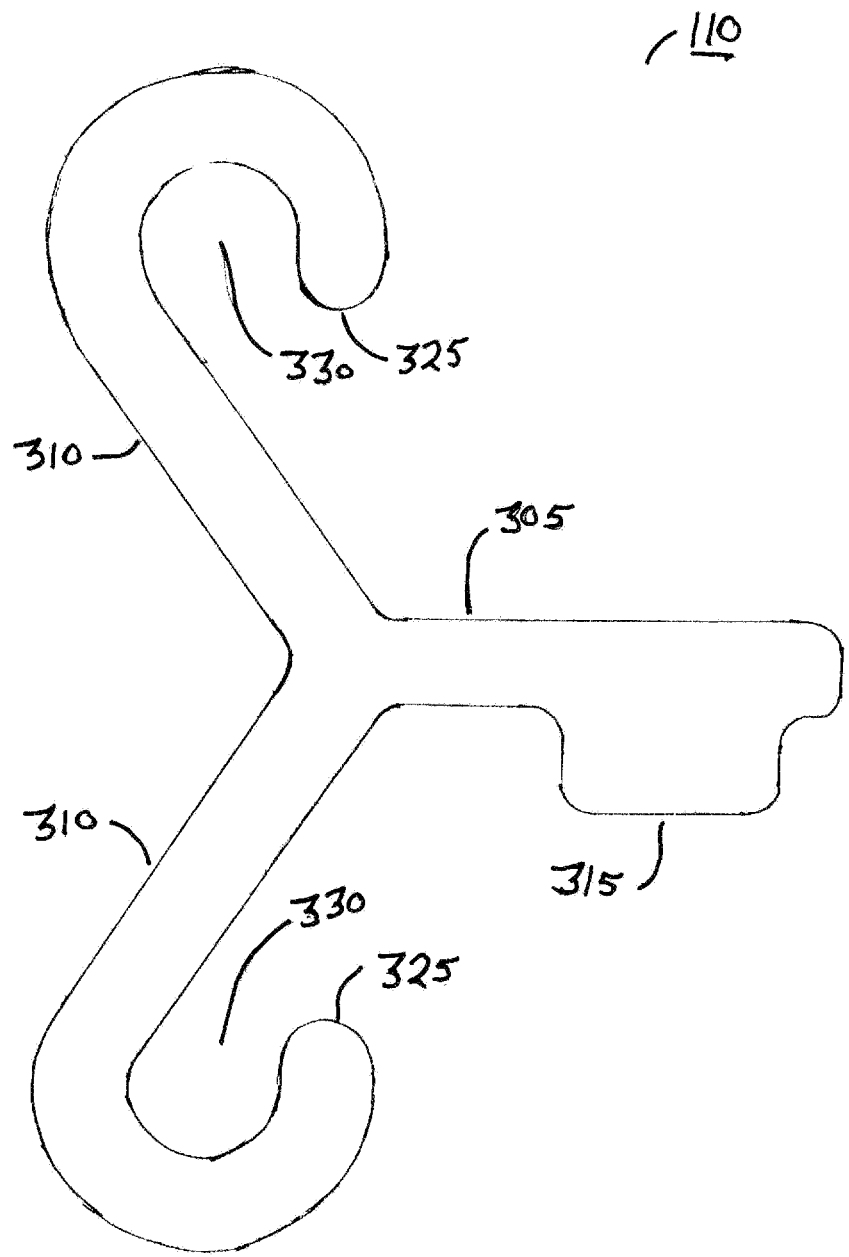
FIG. 8 is a top view of the Y-bracket of FIG. 7.
Figure 9:
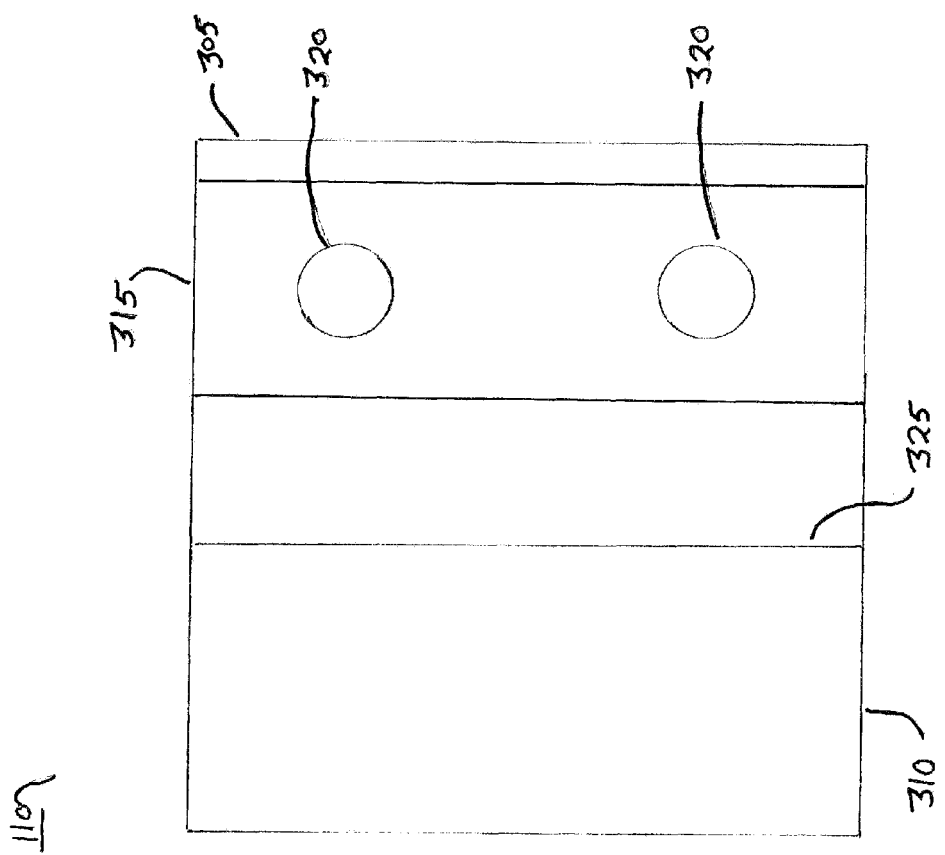
FIG. 9 is a side view of the Y-bracket of FIG. 7.
Figure 10:
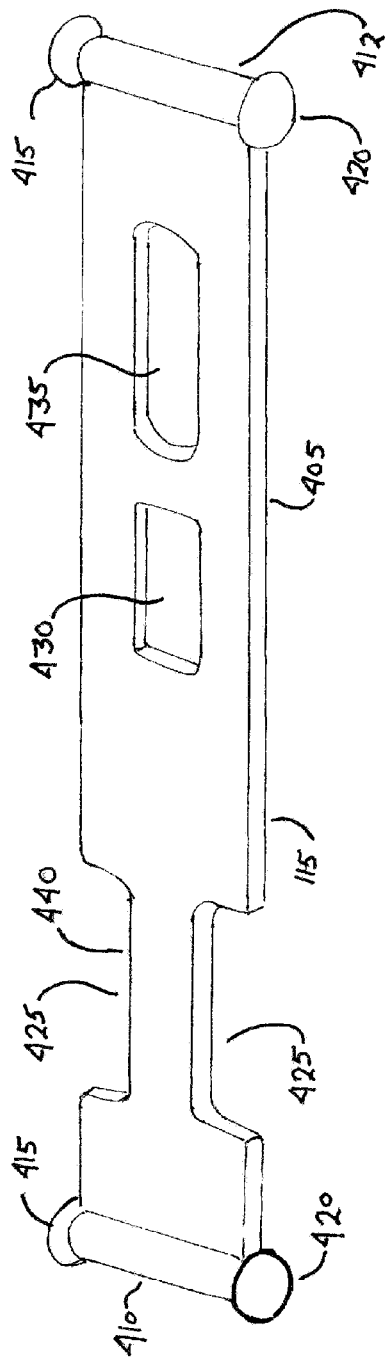
FIG. 10 is an isometric view of a strap in the fairing isolator device of FIG. 3.

FIG. 7 is an isometric view of the Y-bracket 110 in the fairing isolator device shown in FIGS. 3 and 4. FIG. 8 is a top view of the Y-bracket 110, and FIG. 9 is a side view of the Y-bracket 110. The Y-bracket 110 has a leg 305 and two arms 310 configured to form a "Y" shape. The leg 305 has a portion 315 that is thicker than the rest that also includes tapped holes 320 for making a connection to a fairing. In the conventional Y-bracket shown in FIGS. 1 and 2, the holes are untapped and nuts are welded over holes. The tapped holes 320 provide the benefit of accurate placement which is difficult in the welded nuts method. The end 325 of each arm 310 of the Y-bracket is curled back on itself in the direction of the leg, forming a channel 330.

The Y-bracket is, for example, extruded aluminum. Like the cylindrical bracket, use of aluminum results in a lighter weight piece than in many conventional devices. The Y-bracket of the present embodiment is formed and configured to enable the Y-bracket to be extruded as a single piece also saves manufacturing steps over manufacture of conventional devices. In an alternative embodiment, the Y-bracket is made of 30% glass-filled nylon. In a further alternative embodiment, the end of each arm of the Y-bracket is thicker than the lower section in order to form a narrower entrance to the channel.

Figure 11:
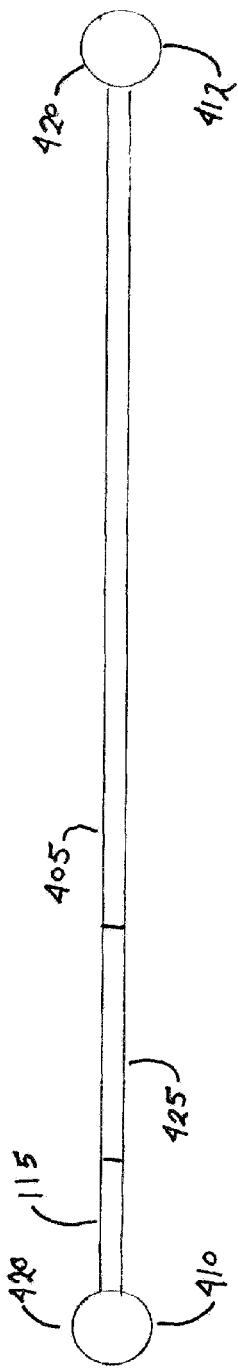
FIG. 11 is a top view of the strap of FIG. 10.
Figure 12:
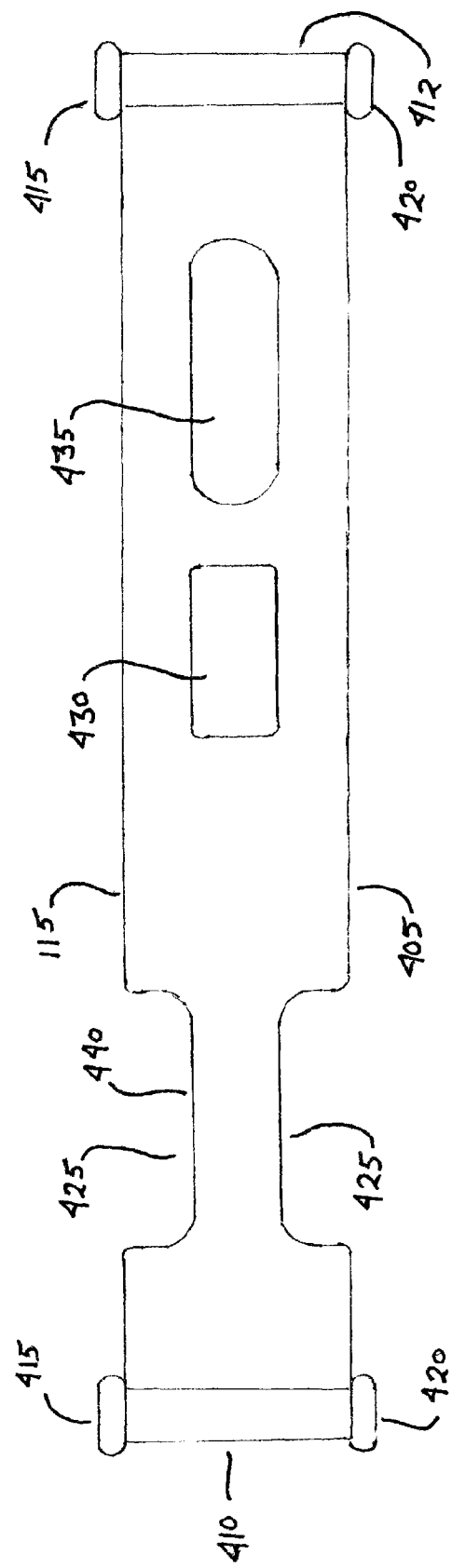
FIG. 12 is a side view of the strap of FIG. 10.

FIG. 11 is an isometric view of the strap 115 in the fairing isolator device shown in FIGS. 3-5. FIG. 12 is a top view of the strap 115, and FIG. 13 is a side view of the strap 115 of FIG. 12. The strap 115 has a long, flat section 405 that has a first and a second enlarged and rounded end 410, 412. The top 415 and bottom 420 of each enlarged end 410, 412 are bulbous. The flat section 405 has two cutouts 425 close to the first enlarged end 410. The flat section 405 further includes two slots 430, 435. One of the slots 430 is rectangular in shape and is arranged and configured on the flat section 405 to accommodate the post 215 of the cylindrical bracket 105. The second slot 435 is closer to the second enlarged end 412 and is rounded. Further, the second slot 435 is arranged and configured to enable the first enlarged end 410 to pass through it so that the strap 115 can be wrapped around the cylindrical bracket 105. The width of the slot 435 is substantially the width of the strap 115 in the section 440 having the cutouts 425. The strap 115 is flexible and elastic. The strap is made of, for example, rubber.

Returning to consideration of FIG. 3, the cylindrical bracket 105 and Y-bracket 110 are coupled with the strap 115. The strap 115 is wrapped around cylindrical bracket 105 with the post 215 extending through the rectangular slot 430. The first end 410 of the strap 115 is passed through the rounded slot 435 to form a loop around the cylinder portion 205 of the cylindrical bracket 105. One enlarged end 410 of the strap 115 is inserted into the channel 330 formed by the curled-back portion of one arm 310 of the Y bracket 110. The arm 310 is then crimped to hold the strap 115 in place. The other enlarged end 412 of the strap 115 is inserted into the curled-back portion of the other arm 310 of the Y-bracket 110. This other arm is then crimped to hold the strap in place. In an alternative embodiment, the enlarged ends are press fit into the arms of the Y-bracket. In one arrangement, the arm end is thicker in order to form a narrower channel entrance in order to more effectively accomplish a press fit. The bulbous top and bottom of the enlarged ends help position the strap ends on the Y-bracket and keep the ends from slipping out of the bracket arms. This means for engaging the strap with the Y-bracket obviates the need for bolts or rivet connections with the Y-bracket.

Embodiments of the brackets described above are made of aluminum, however one of skill in the art will understand that alternative materials such as plastic are possible within the scope of the invention. One such plastic is glass-filled nylon. While 30% glass-filled nylon is cited in the description above with regard to the Y-bracket and the cylindrical bracket, one skilled in the art will understand that higher percentages of glass filler are possible within the scope of the invention, for example 40% glass-filled nylon or 60% glass-filled nylon.

It is to be understood that the above-identified embodiments are simply illustrative of the principles of the invention. The depicted embodiments may not be drawn to scale and are to be understood as illustrative of the invention and not as limiting in any way. Various and other modifications and changes may be made by those skilled in the art which will embody the principles of the invention and fall within the spirit and scope thereof.

We claim:

1. A vibration isolator device, comprising:
   a cylindrical bracket having a post coupled to a cylindrical portion;
   a Y-bracket having a leg and a first arm and a second arm where each of the first and second arms has an end curled outward and down toward the leg forming a first channel and a second channel respectively; and
   a strap having a flat section and first and second enlarged ends, the flat section formed and configured to wrap around the cylindrical portion of the cylindrical bracket, the first enlarged end formed and configured to enter the first channel, the second enlarged end formed and configured to enter the second channel thereby coupling the cylindrical bracket to the Y-bracket.

2. The vibration isolator device of claim 1 wherein the strap is elastic.

3. The vibration isolator device of claim 1 wherein the post of the cylindrical bracket has cut-outs.

4. The vibration isolator device of claim 1 wherein the cylindrical bracket and the Y-bracket are formed and configured to be manufactured by extrusion.

5. The vibration isolator device of claim 1 wherein the cylindrical bracket and the Y-bracket are made of aluminum.

6. The vibration isolator device of claim 1 wherein the cylindrical bracket and the Y-bracket are made of glass-filled nylon.

7. The vibration isolator device of claim 1 wherein the first arm of the Y-bracket is crimped over the first enlarged end of the strap and the second arm of the Y-bracket is crimped over the second enlarged end of the strap.

8. The vibration isolator device of claim 1 wherein the first enlarged end of the strap is press fit into the first channel and the second enlarged end of the strap is press fit into the second channel.

9. The vibration isolator device of claim 1 wherein each enlarged end of the strap has a bulbous top and bottom.

* * * * *